(12) United States Patent
Sabraoui et al.

(10) Patent No.: US 12,331,845 B2
(45) Date of Patent: Jun. 17, 2025

(54) MONITORING A SOLENOID VALVE

(71) Applicant: SAGEMCOM ENERGY & TELECOM SAS, Rueil Malmaison (FR)

(72) Inventors: Abbas Sabraoui, Rueil Malmaison (FR); Ahmet Samed Basturk, Rueil Malmaison (FR); Oussama Abid, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 12 days.

(21) Appl. No.: 18/308,518

(22) Filed: Apr. 27, 2023

(65) Prior Publication Data

US 2023/0349485 A1 Nov. 2, 2023

(30) Foreign Application Priority Data

Apr. 29, 2022 (FR) .................................. FR2204105

(51) Int. Cl.
*F16K 37/00* (2006.01)
*G01F 1/66* (2022.01)
*G01F 1/667* (2022.01)
*G01F 15/00* (2006.01)

(52) U.S. Cl.
CPC .......... *F16K 37/0041* (2013.01); *G01F 1/662* (2013.01); *G01F 1/667* (2013.01); *G01F 15/005* (2013.01)

(58) Field of Classification Search
None
See application file for complete search history.

(56) References Cited

U.S. PATENT DOCUMENTS

| | | | |
|---|---|---|---|
| 10,409,296 B1* | 9/2019 | Elle | G05D 7/0635 |
| 10,632,489 B1 | 4/2020 | Wang | |
| 2018/0306617 A1 | 10/2018 | Bonomi | |
| 2021/0394002 A1 | 12/2021 | Laskaris et al. | |
| 2022/0154847 A1* | 5/2022 | Nøhr Christiansen | G05B 15/02 |

FOREIGN PATENT DOCUMENTS

DE  10 2011 101 074 A1  11/2012

* cited by examiner

*Primary Examiner* — Angelisa L. Hicks
(74) *Attorney, Agent, or Firm* — MUNCY, GEISSLER, OLDS & LOWE, P.C.

(57) ABSTRACT

A method for monitoring a solenoid valve, including regularly repeated monitoring stages and each comprising the steps of driving the electric motor of the solenoid valve to modify the current position of it movable member; evaluating a monitoring value representative of an inrush current of the electric motor during the driving step; comparing the monitoring value with at least one first predetermined threshold and, if the monitoring value is greater than said first predetermined threshold, implementing at least one corrective action to avoid a blockage of the solenoid valve.

13 Claims, 6 Drawing Sheets

MONITORING A SOLENOID VALVE

The invention relates to the field of solenoid valves used to control the flow rate of any type of fluid flowing in a conduit. Such a solenoid valve is possibly—but not necessarily—integrated into a fluid meter.

BACKGROUND OF THE INVENTION

An ultrasonic fluid meter will most usually comprise a conduit in which the fluid flows, and an ultrasonic measuring device comprising an upstream transducer (on the network side) and a downstream transducer (on the subscriber's installation side). Each transducer acts in succession as an emitter and as a receiver of ultrasonic signals. The upstream transducer therefore emits an ultrasonic signal into the conduit, which is received by the downstream transducer after having travelled in the fluid along a predefined path (of precisely known length). Next, the downstream transducer in turn emits an ultrasonic signal which is received by the upstream transducer after having travelled in the fluid along the predefined path (in the other direction). The ultrasonic measuring device then evaluates the flow rate of the fluid on the basis of the times of flight of the ultrasonic signals between the transducers. Estimating the fluid flow rate makes it possible to evaluate and invoice the quantity of fluid consumed.

In some countries, meters must be capable of limiting, regulating and shutting off the flow rate of fluid. As an example, in some countries and in the case of an unpaid water bill, the water distributor must provide the "bad payer" end-customer with a minimum flow rate for a certain number of days before completely shutting off access to the water.

This minimum flow rate may vary as a function of the country and the customer, and it is therefore necessary to have the possibility of regulating the flow rate "on demand": the flow rate has to be adjusted as a function of a flow rate setpoint.

In order to regulate the flow rate, proposals have been made to integrate a solenoid valve into the meter conduit, for example a ball solenoid valve. The angular position of the ball can be controlled remotely in order to regulate the flow rate.

However, there is a non-negligible risk of blocking the ball of the solenoid valve, and in particular:
  in the presence of impurities in the fluid, for example limestone or sand in the water, or dust in the air or in the gas;
  when the ball remains in a static position for a long period of time, thereby causing impurities to accumulate in the contact zone between the ball and the seat.

This phenomenon also depends on the materials used for manufacturing the ball and the seat. The seat is conventionally made of Teflon, and the friction of the ball on the Teflon depends on the material used to make the ball (stainless steel, brass, etc.).

In order to solve this problem of blocking the ball, proposals have been made to integrate a piezoelectric power transducer into the conduit in the immediate vicinity of the solenoid valve. The transducer produces a low-frequency wave resulting in a depression that generates cavitation. The implosion of the cavitation bubbles makes it possible to eliminate the fouling.

However, this solution is complex to implement and expensive, since it requires integrating into the meter not only said piezoelectric transducer in order to generate cavitation, but also a large energy source in order to excite said transducer. Moreover, this solution is problematic because the presence of the cavitation bubbles around the ball tends to disturb the measurement of the flow rate via ultrasound, in the case where the ball and the cavitation generator are located between the two transducers dedicated to the flow rate measurements.

OBJECT OF THE INVENTION

An object of the invention is to detect, in an effective, simple, inexpensive manner, and without disturbing the measurement of the flow rate, a blockage or a future blockage of the moving member of a solenoid valve, and to act against this blockage or future blockage.

SUMMARY OF THE INVENTION

In order to achieve this aim, a method for monitoring a solenoid valve is provided, the solenoid valve comprising:
  a movable member which extends in the conduit and for which a current position can be regulated in order to control the current flow rate of fluid that can flow in the conduit;
  an electric motor arranged to cause the movable member to move so as to give it its current position;
  the monitoring method comprising regularly repeated monitoring stages and each comprising the steps of:
    driving the electric motor to modify the current position of the movable member;
    evaluating a monitoring value representative of an inrush current of the electric motor during the driving step;
    comparing the monitoring value with at least one first predetermined threshold and, if the monitoring value is greater than said first predetermined threshold, implementing at least one corrective action to avoid a blockage of the solenoid valve.

The movement of the movable member of the solenoid valve by the electric motor requires a certain inrush current. This inrush current varies as a function of the level of fouling present at the interface between the movable member and the stationary part of the solenoid valve. The monitoring method therefore evaluates the fouling from the monitoring value, and triggers a corrective action in advance before the fouling level becomes problematic and risks blocking the solenoid valve. The monitoring method is very effective and its implementation is both simple and inexpensive, since it does not require a dedicated component.

In the case in which the solenoid valve is integrated into a meter, it can be ensured that the flow rate measurement is not disturbed by the implementation of the monitoring method by implementing the monitoring stages only at zero flow rate.

There is also provided a monitoring method as described above, wherein the at least one corrective action comprises a first corrective action consisting in increasing a frequency of implementation of the monitoring stages.

There is also provided a monitoring method as described above, wherein the at least one corrective action comprises a second corrective action consisting in increasing a frequency of implementation of the monitoring stages.

There is also provided a monitoring method as described above, wherein each monitoring stage comprises the step, if the monitoring value is greater than said first predetermined threshold, of comparing with a predetermined frequency threshold the frequency of implementation of the monitoring stages, and the step of:

if said frequency of implementation is less than the predetermined frequency threshold, implementing the first corrective action; or if said frequency of implementation is higher than the predetermined frequency threshold, implementing the second corrective action.

There is also provided a monitoring method as described above, wherein each monitoring stage further comprises the steps, if the monitoring value is less than said first predetermined threshold, of comparing the monitoring value with a second predetermined threshold less than the first predetermined threshold and, if the monitoring value is less than said second predetermined threshold, of reducing a frequency of implementation of the monitoring stages.

There is also provided a monitoring method as described above, further comprising the step of acquiring measurements of a current flow rate of the fluid in the conduit, the monitoring steps being implemented only when the current flow rate is zero.

There is also provided a monitoring method as described above, wherein the monitoring value is equal to a ratio between the inrush current and a rated current of the electric motor during the driving step.

There is also provided a flow rate control system comprising a solenoid valve, a current sensor arranged to measure an electric current supplied to the electric motor, and a processing circuit in which the monitoring method as described above is implemented.

There is also provided a flow rate control system as described above, further comprising a power supply component arranged to power the processing circuit and the electric motor of the solenoid valve, the current sensor being a shunt mounted in parallel with two outputs of the power supply component.

There is also provided a flow rate control system as described above, wherein the solenoid valve is a ball valve.

There is also provided a fluid meter including a flow rate measurement device and a flow rate control system as described above.

There is also provided a fluid meter as described above, the flow rate measurement device being an ultrasonic measurement device comprising two transducers arranged to emit and receive ultrasonic signals in the conduit, the ultrasonic measurement device being arranged to evaluate a current flow rate of the fluid from the time of flight of the ultrasonic signals between the transducers.

There is also provided a fluid meter as described above, the solenoid valve being positioned along a length of the conduit between the two transducers.

There is also provided a computer program which comprises instructions which cause the processing circuit of the system as described above to execute the steps of the monitoring method as described above.

There is also provided a computer-readable storage medium, storing the above-described computer program.

The invention can be better understood in the light of the following description of a particular, non-limiting embodiment of the invention.

BRIEF DESCRIPTION OF THE DRAWING

Reference will be made to the accompanying drawings, among which.

DETAILED DESCRIPTION OF THE INVENTION

Figure 1:
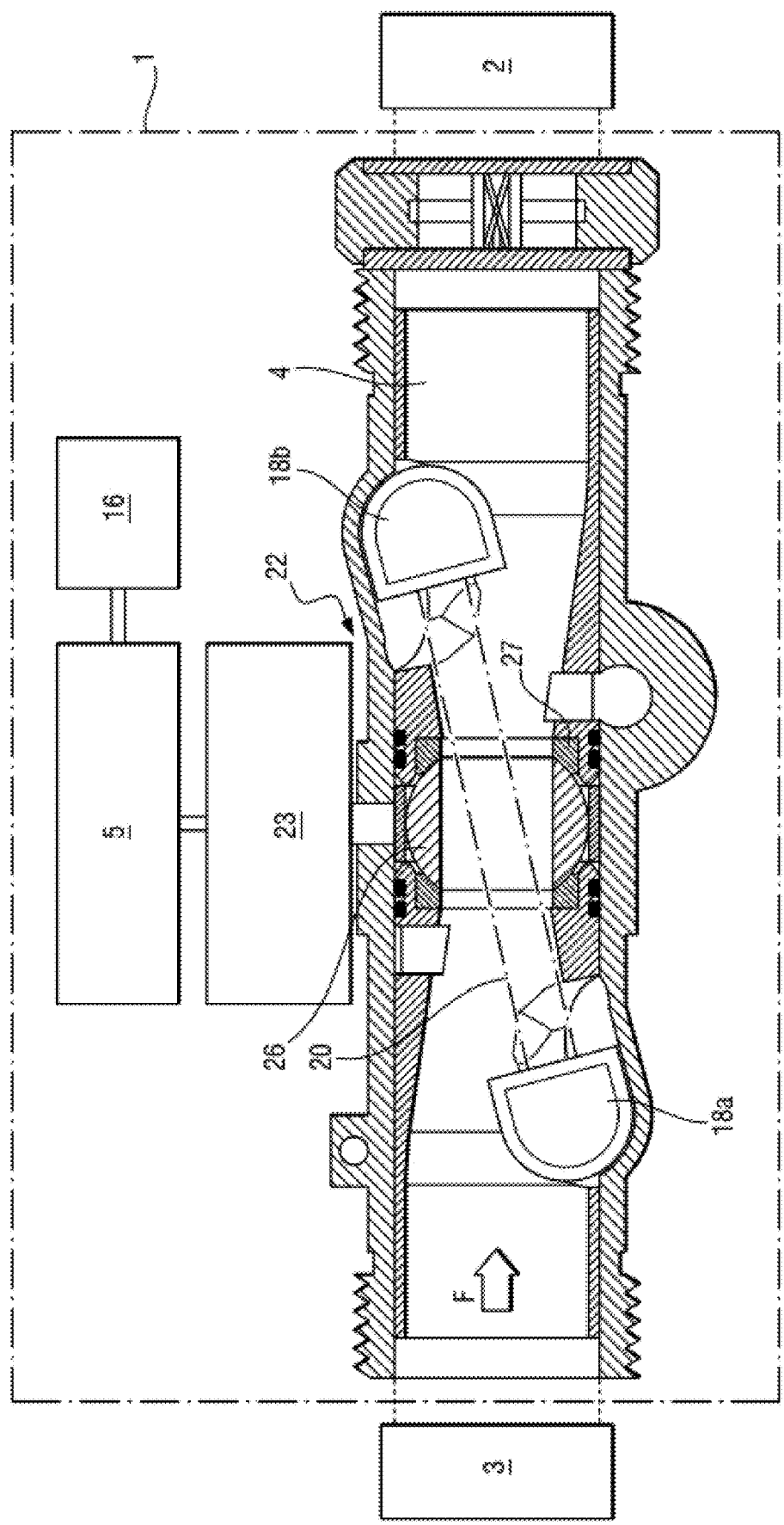
FIG. 1 shows a meter comprising a conduit, a solenoid valve, an ultrasonic measurement device, and a processing circuit.
Figure 2:
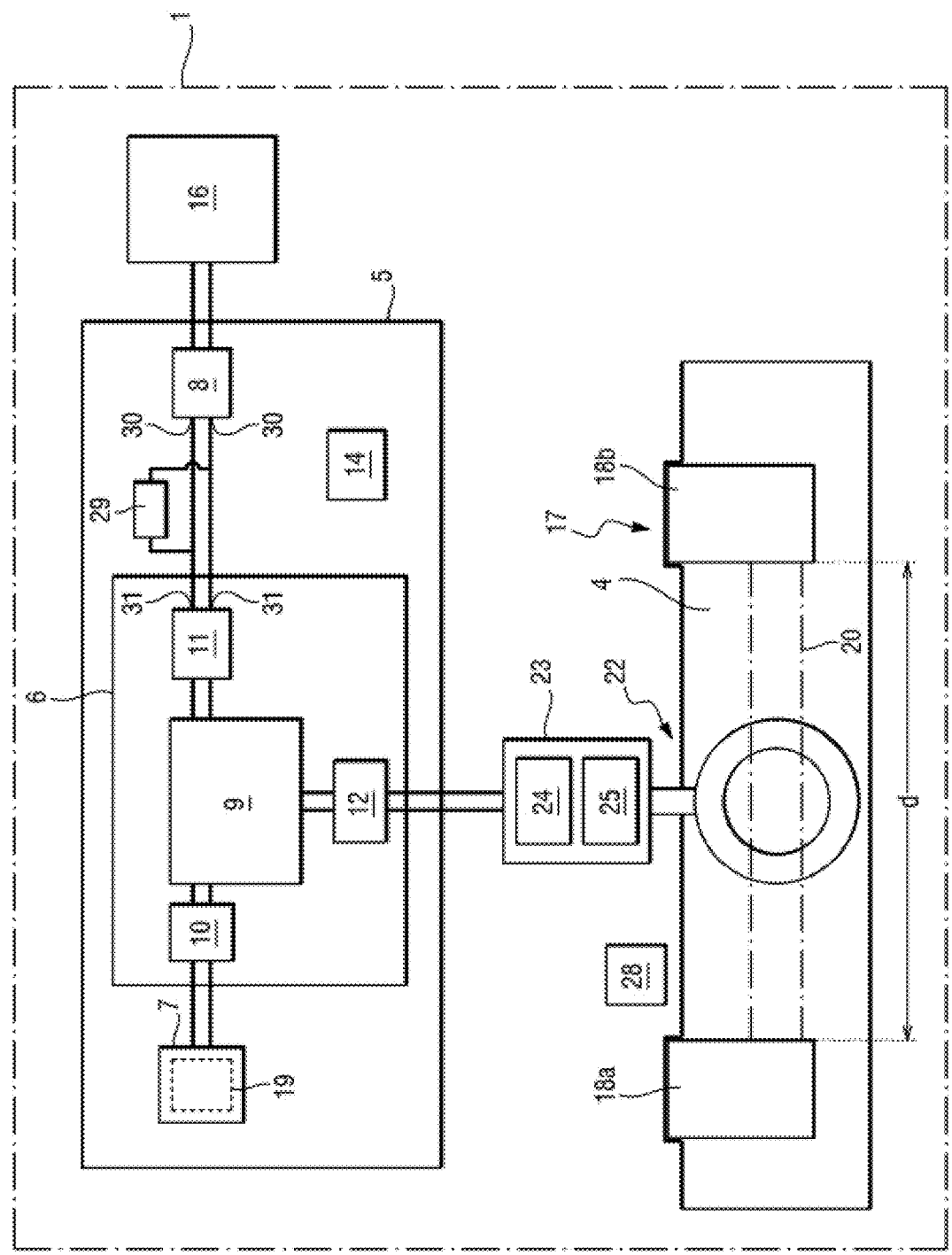
FIG. 2 diagrammatically shows the meter of FIG. 1 and various components of the processing circuit.

With reference to FIGS. 1 and 2, the invention is embodied in an ultrasonic water meter 1. Here, the meter 1 is a water meter which is used to measure the water consumption of an installation 2 of a subscriber. The water is supplied to the installation 2 of the subscriber by a water distribution network 3.

The meter 1 comprises a conduit 4 in which the water supplied by the network 3 to the installation 2 flows. The water flows in the conduit 4 from upstream to downstream, as indicated by the direction of the arrow F. Here, the term "upstream" means on the side of the network 3, and the term "downstream" means on the side of the installation 2.

The meter 1 further includes a processing circuit 5 that includes a microcontroller 6, an application specific integrated circuit (ASIC) 7, and a power supply component 8.

The microcontroller 6 integrates a CPU 9 (for Central Processing Unit), an SPI communication module 10 (for Serial Peripheral Interface), an analog-to-digital converter 11 and a digital-to-analog converter 12. The processing circuit 5 also comprises one or more memories 14. At least one of these memories 14 forms a computer-readable storage support on which at least one computer program comprising instructions which cause the microcontroller 6 to execute at least some of the steps of the monitoring method which will be described below are stored.

The CPU 9 is connected to the SPI communication module 10 which is itself connected to the ASIC 7. The CPU 9 is also connected to the analog-to-digital converter 11 and to the digital-to-analog converter 12.

In this example, the power supply component 8 is an LDO (low-drop-out) voltage regulator. The power supply component 8 is connected to the microcontroller 6 and, in particular, to the analog-to-digital converter 11.

The meter 1 also comprises a battery 16 having two terminals connected to the power supply component 8 of the processing circuit 5.

The meter 1 further comprises an ultrasonic measurement device 17 which makes it possible to measure the flow rate of water supplied to the installation 2 by the network 3.

The ultrasonic measurement device 17 includes an upstream transducer 18a and a downstream transducer 18b. The ultrasonic measuring device 17 also includes a measurement module 19 connected to the upstream transducer 18a and to the downstream transducer 18b. Here, the processing module 19 is implemented in the ASIC 7.

The upstream transducer 18a and the downstream transducer 18b are (but not necessarily) paired. Here, the upstream transducer 18a and the downstream transducer 18b are piezoelectric transducers.

Each transducer 18a, 18b acts in succession as an emitter and a receiver of ultrasonic signals.

The processing module 19 generates or controls the generation of an electrical excitation signal which is applied as input to the emitter. The emitter then generates an ultrasonic signal. The receiver receives the ultrasonic signal after it has travelled in the fluid along a predefined path 20, and the processing module 19 measures the time of flight.

The predefined path 20 here is a straight path (inclined with respect to a longitudinal axis of the conduit 4, as is the case in FIG. 1, or parallel to said axis, as is the case in FIG. 2). The predefined path 10 has a length d, which is very precisely known.

Thus, firstly, the upstream transducer 18a emits the ultrasonic signal which is received by the downstream transducer 18b. The processing module 19 measures the time of flight from upstream to downstream, $TOF_{UP}$.

Next, the downstream transducer 18b emits the ultrasonic measurement signal which is received by the upstream transducer 18a. The processing module 19 measures the time of flight from downstream to upstream, $TOF_{DN}$.

The processing module 19 then calculates, based in particular on the times of flight $TOF_{UP}$ and $TOF_{DN}$ the speed of sound in the water, the speed of flow of the water, and the flow rate of the water.

The meter 1 also comprises a solenoid valve 22 which makes it possible to regulate, limit or shut off the flow rate of water.

The solenoid valve 22 is positioned between the two transducers 18a, 18b along a length of the conduit 4.

The solenoid valve 22 comprises a geared motor 23 itself comprising an electric motor 24 and a reducer 25. The solenoid valve 12 comprises a movable member which extends in the conduit 4 and for which a current position can be regulated in order to control the current flow rate of water. Here, the solenoid valve 22 is a ball valve and the movable member is therefore a ball 26; the current position of the ball 26 is an angular position. The geared motor 23 serves to control the solenoid valve 22.

The solenoid valve 22 also includes a seat 27 for the ball 26. The seat 27 forms a sealed gasket between the ball 26 and the conduit 4.

The meter 1 also comprises a position sensor 28 (shown diagrammatically in FIG. 2) configured to measure the current angular position of the ball 26.

The meter 1 additionally comprises communication means which can be used to implement any type of communication, for example communications via a 2G, 3G, 4G, Cat-M or NB-IOT cellular network, communications in accordance with the LoRa protocol, radio communications in accordance with the Wize standard operating at a frequency of 169 MHz, etc.

The monitoring method according to the invention, which is implemented by the microcontroller 6 of the processing circuit 5, includes monitoring stages that are repeated regularly.

During each monitoring stage, the microcontroller 6 firstly controls the electric motor 24 to modify the current angular position of the ball 26. The movement of the ball 26 makes it possible to limit the deposition of impurities and to clean the interface between the movable part and the stationary part of the solenoid valve 22, that is to say between the ball 26 and the seat 27. Modifying the current position of the ball 26 is, for example, a quarter-turn rotation.

Thereafter, the microcontroller 6 attempts to detect fouling. For this purpose, the microcontroller 6 evaluates a monitoring value representative of the inrush current of the electric motor 24 during the driving step that has just been mentioned, i.e. when the electric motor 24 modifies the current position of the ball 26. In this example, the monitoring value is equal to a ratio between the inrush current and the rated current of the electric motor 24 during the driving step.

The movement of the ball 26 of the solenoid valve 22 indeed requires the electric motor 24 to be supplied with a certain inrush current (also referred to as a starting current or a switching-on current) which is generally 10 to 20 times greater than the rated current.

Figure 3:
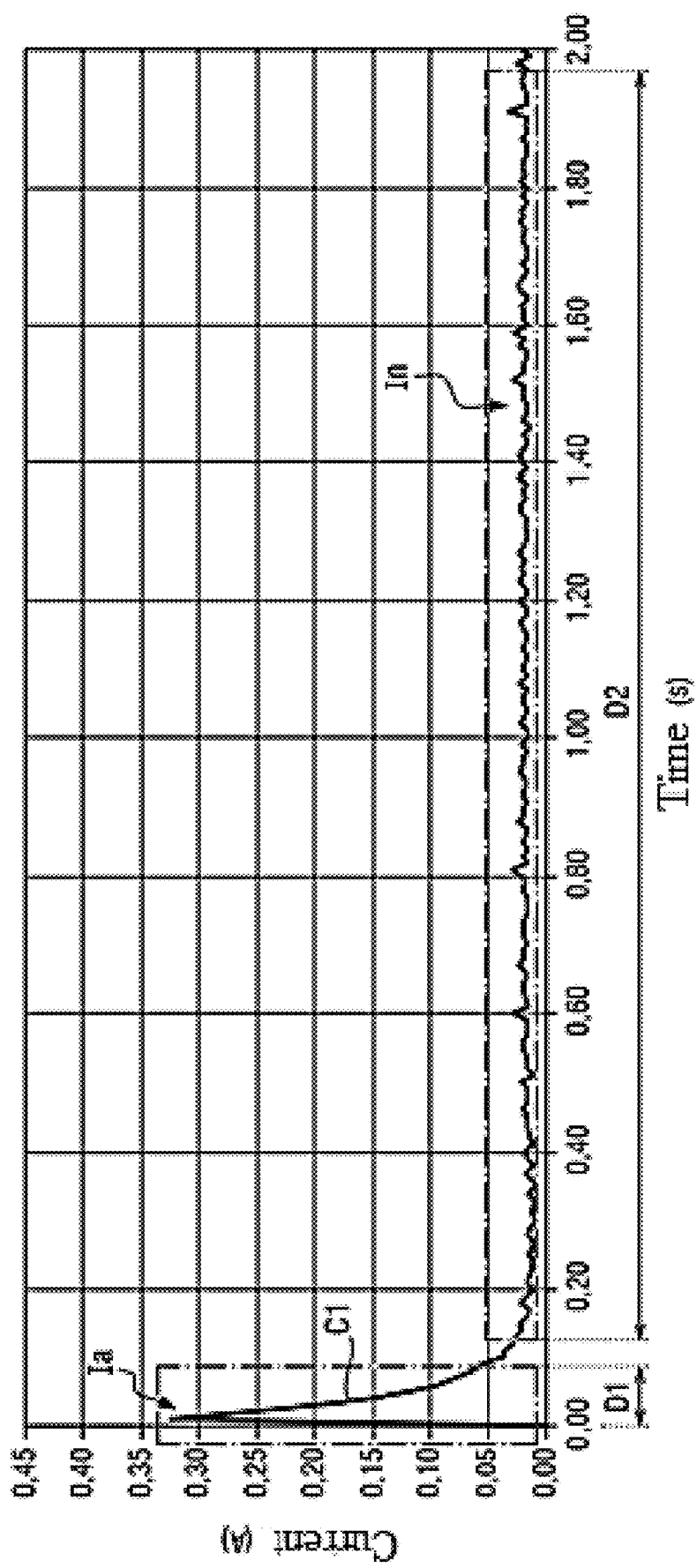
FIG. 3 shows a graph comprising a plot of the electric current supplied to the motor of the solenoid valve.

The plotC1 in FIG. 3 shows an example of the current supplied to the electric motor of a solenoid valve integrated in a residential water meter. A distinction is made between the inrush current Ia and the rated current In.

The term "inrush current" is used herein to mean the maximum value of the current at the peak present in the time interval D1. The term "rated current" is used to mean, for example, an average of the current over the time interval D2.

By way of example, the inrush current Ia is of the order of 330 mA. By way of example, the duration of the peak is in the range from 20 to 30 ms. By way of example, the rated current IN is stable and of the order of 20 mA.

However, fouling will increase the frictional force between the ball 26 and its mechanical support (the seat 27), so that the movement of the ball 26 requires a higher inrush current.

Figure 4:
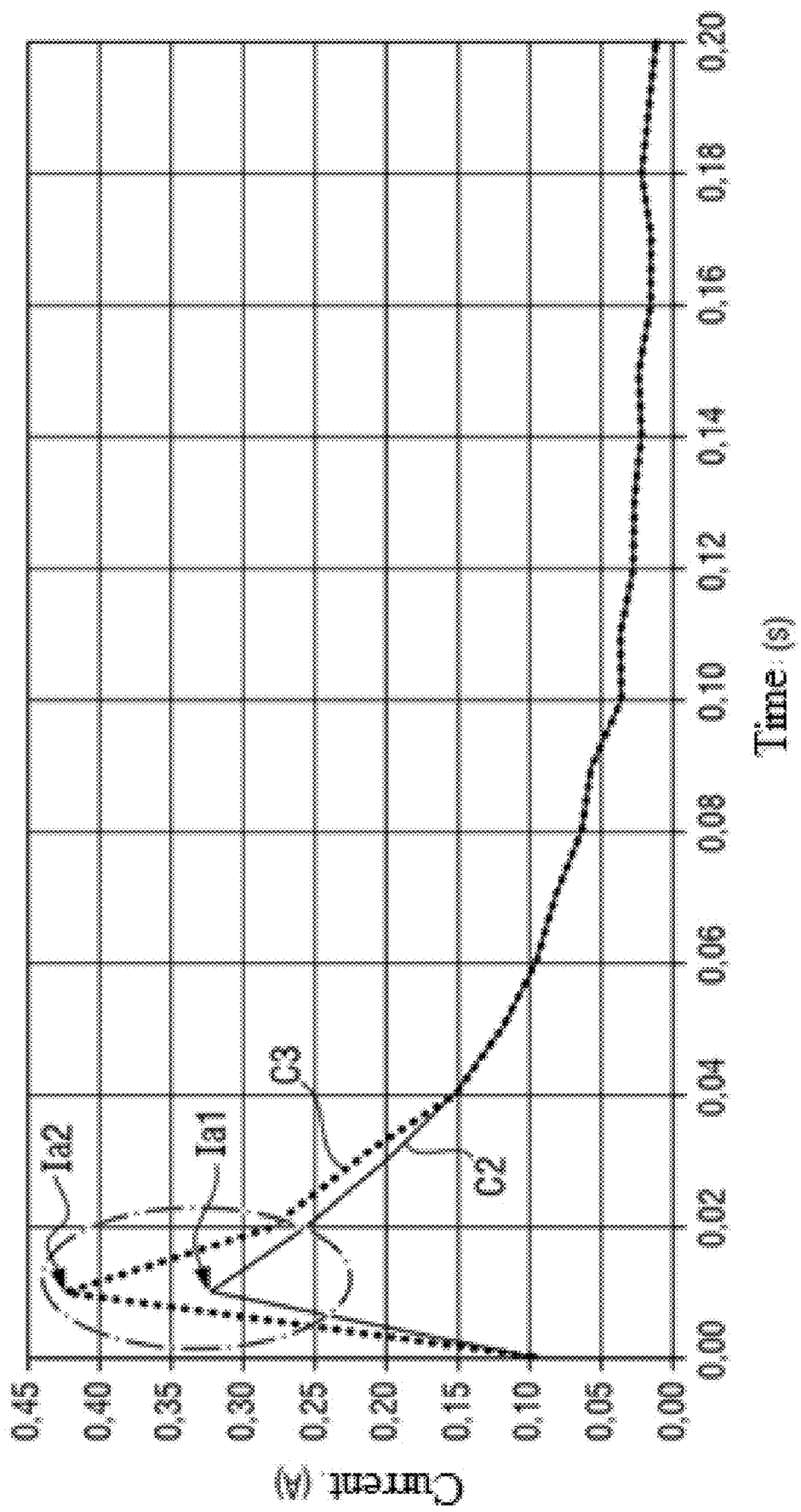
FIG. 4 shows a graph comprising a plot of the electric current before fouling, and a plot of the electric current after fouling.

The plot C2 of FIG. 4 shows the inrush current Ia1 of a solenoid valve that has just been installed, and the plot C3 shows the inrush current Ia 2 after 1 month of use of the solenoid valve in water loaded with limestone.

It should be observed that the inrush current has increased from 330 mA to 420 mA. Once the fouling has been removed, the current quickly converges to its nominal value (around 20 mA).

Therefore, the ratio between the inrush current and the rated current is a good indicator of the level of fouling. It is therefore possible to measure it and to monitor its evolution with respect to a reference value.

To evaluate the monitoring value, that is to say here the ratio between the inrush current and the rated current, the processing circuit 5 uses the measurements produced by a current sensor.

The current sensor is here a shunt 29, i.e. a precision resistor of low value (of the order of milliohms or fractions of milliohms). In this example, the shunt 29 is connected in parallel with two outputs 30 of the power supply component 8, i.e. the shunt 29 comprises one terminal connected to one of the outputs 30 and another terminal connected to the other of the outputs 30. The two outputs 30 are themselves connected to two inputs 31 of the analog-to-digital converter 11 of the microcontroller 6. The analog-to-digital converter 11 enables to convert the analog signal produced by the power supply component 8 into a digital value processed by the CPU 9.

The shunt 29 develops a voltage proportional to the current flowing through it.

The equation that describes this relationship is as follows:

$$I = V/R,$$

where I denotes the current in amperes, V represents the potential difference across the terminals of the shunt 29 expressed in volts and R is the value of the resistance of the shunt 29 expressed in ohms.

Here, the battery 16 supplies, via the power supply component 8, the processing circuit 5 and the ultrasonic measurement device 17. The digital-to-analog converter 12 makes it possible to convert a drive setpoint for the ball 26, produced by an algorithm implemented by the CPU 9, into an analog signal for controlling the solenoid valve 22. The battery 16 therefore also powers the solenoid valve 22 (i.e. the electric motor 24) via the power supply component 8.

The current measurements produced by the shunt 29 therefore make it possible, by subtracting the current consumed by the processing circuit 5 and the ultrasonic measurement device 17, to evaluate the current supplied to the electric motor 24, and therefore the inrush current and the rated current.

If the monitoring value becomes too large, the microcontroller 6 implements at least one corrective action to avoid a (future) blockage of the solenoid valve 22.

A first corrective action consists in increasing the frequency of implementation of the monitoring stages (that is to say in reducing the duration between two successive monitoring stages). The increase in the frequency at which the solenoid valve 22 is activated makes it possible to eliminate fouling more effectively.

A second corrective action consists in increasing a power supply voltage of the electric motor 24 of the solenoid valve 22.

Figure 5:
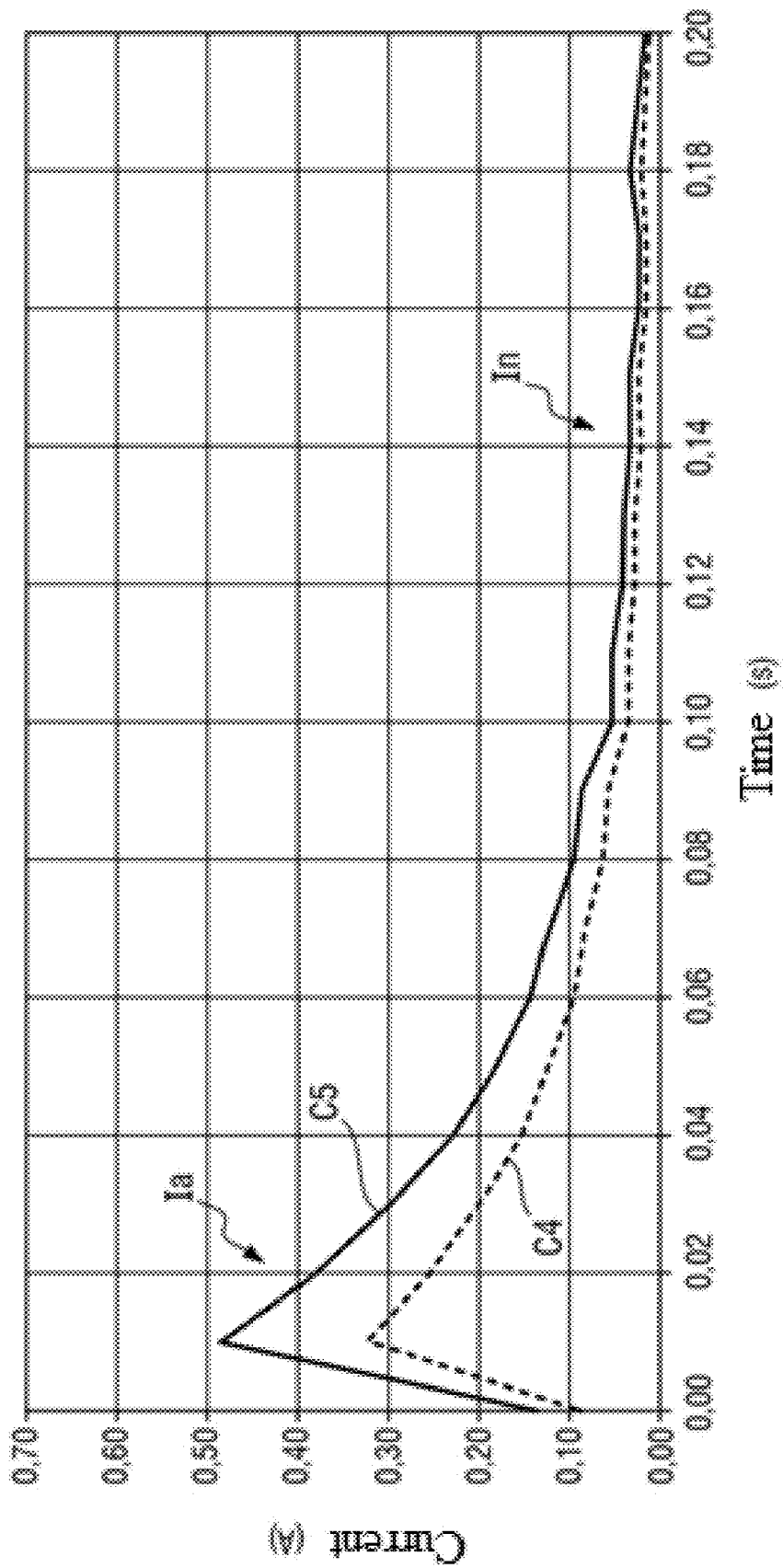
FIG. 5 shows a graph comprising a plot of the electric current when the motor is supplied with 3.6V, and a plot of the electric current when the motor is supplied with 5V.

FIG. 5 shows the impact of the power supply voltage of the electric motor 24 on the inrush current and on the rated current of the solenoid valve: the plot C4 corresponds to a voltage of 3.6 V and the plot C5 corresponds to a voltage of 5 V. The increase in the power supply voltage results in a greater power which will have the consequence of increasing the speed of rotation of the ball 26 and the torque of the electric motor 24, which will facilitate the removal of the fouling layer.

Third corrective action consists in producing an alarm message and in transmitting it to the information system (IS) of the water dispenser using the above-mentioned communication means. The alarm could also be transmitted to the subscriber.

Figure 6:
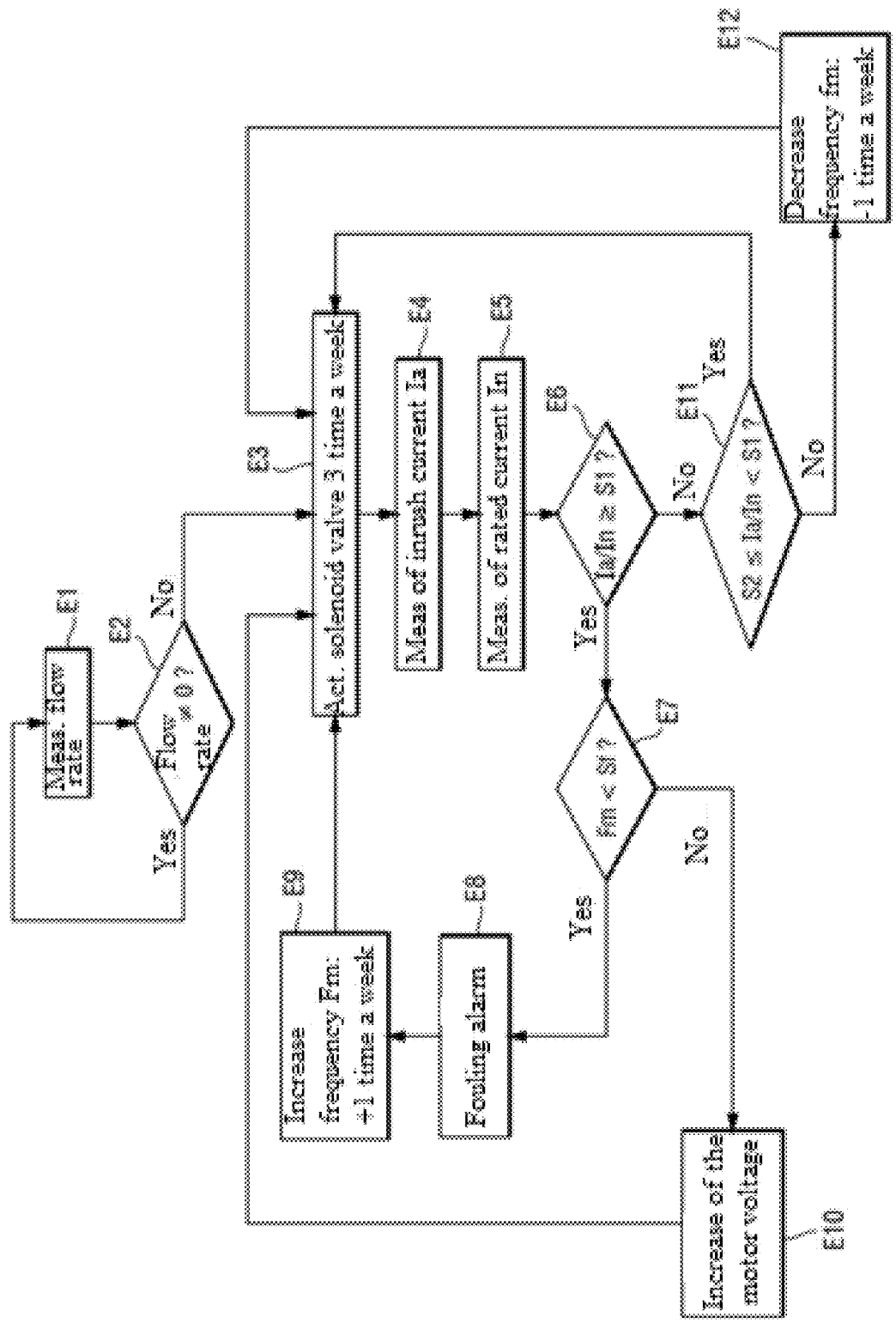
FIG. 6 shows steps of the measurement method of the invention.

With reference to FIG. 6, there follows a description of a particular embodiment of the monitoring method of the invention.

The monitoring stages are implemented only when the current flow rate of water is zero. This makes it possible to avoid disturbing the measurement of the flow rate and therefore the billing of the customer, but also to avoid penalizing the customer if the ball 26, for the purposes of the monitoring method, is driven into a position that reduces the current flow rate.

The microcontroller 6 acquires the flow rate measurements produced by the ultrasonic measuring device 17 (step E1), then compares the current flow rate with a zero flow rate (step E2).

If the current flow rate is non-zero, the method goes back to step E1. Otherwise, the algorithm moves on to step E3.

A monitoring stage is then implemented. By way of example, the frequency of initial implementation of the monitoring stages is equal to three times a week, i.e. the monitoring stages are initially triggered three times a week.

In step E3, the microcontroller 6 drives the electric motor 24 to modify the current position of the ball 26.

The microcontroller 6 acquires the current measurements produced by the shunt 29, and evaluates the inrush current Ia (step E4), the rated current In (step E5), and the monitoring value Ia/In.

The microcontroller 6 then compares the monitoring value Ia/In with a first predetermined threshold S1 (step E6). By way of example, the first predetermined threshold S1 is equal to 15.

If the monitoring value is greater than said first predetermined threshold (here greater than or equal to), the microcontroller 6 compares the frequency Fm for implementing the monitoring stages with a predetermined frequency threshold Sf (step E7). By way of example, the predetermined frequency threshold Sf is equal to seven times a week.

If said implementation frequency Fm is lower than the predetermined frequency threshold (here strictly lower), the microcontroller 6 carries out the third corrective action, consisting in producing and transmitting an alarm message (step E8), then the first corrective action, consisting in increasing the frequency of implementation of the monitoring stages (step E9). The frequency Fm is increased by one implementation per week. The method then moves on to step E3.

In step E7, if the frequency Fm for implementing the monitoring stages is greater than the predetermined frequency threshold Sf (here greater than or equal to), the microcontroller 6 performs the second corrective action consisting in increasing the power supply voltage of the electric motor 24 (step E10). The method then moves on to step E3.

In step E6, if the monitoring value Ia/In is less than the first predetermined threshold S1 (here strictly less), the microcontroller 6 compares the monitoring value with a second predetermined threshold S2 that is less than the first predetermined threshold S1 (step E11). By way of example, the first predetermined threshold S2 is equal to 10.

If the monitoring value is greater than the second predetermined threshold (here greater than or equal to), the monitoring method proceeds to step E3. On the other hand, if the monitoring value is below the second predetermined threshold (here strictly below), the microcontroller 6 reduces the frequency Fm of implementation of the monitoring stages. As the fouling is very low, it is possible to reduce the frequency of the monitoring stages (which makes it possible to reduce the electricity consumption).

The frequency Fm is decreased by one implementation a week (step E12). The method then moves on to step E3.

Naturally, the invention is not limited to the embodiment described, but covers any variant coming within the ambit of the invention as defined by the claims.

Clearly, the invention is of application irrespective of the positioning and the configuration of the upstream transducer and the downstream transducer. The ultrasonic signals can be emitted at any angle of orientation with respect to the longitudinal axis of the conduit.

The predefined path between the transducers does not necessarily need to be a straight path. The predefined path could include reflectors, for example mirrors orientated at 45°.

The flow rate measurement device need not necessarily be an ultrasonic measuring device; an electromagnetic measurement device could be used, for example.

The valve does not necessarily need to be a ball valve. Any type of valve may be used to regulate the flow rate, for example a slide valve, a butterfly valve, etc. The position of the movable member, making it possible to regulate the flow rate, is not necessarily an angular position, but may be an axial position.

The architecture of the meter could be different from that described in this case. The communication module between the microcontroller and the ASIC is not necessarily an SPI module. For example, the processing circuit could comprise not an ASIC and a microcontroller, but a single processing component (ASIC, microcontroller, processor, field programmable gate array (FPGA), etc.). The monitoring method is not necessarily implemented in a microcontroller, or even in a single processing component. Some steps of the monitoring process could be performed remotely (e.g. on a cloud server, or cloud).

The current sensor need not necessarily be a shunt, and could be positioned differently, e.g. by being connected directly to the input of the motor.

Clearly, the invention does not apply solely to a water meter, but applies to any meter for any fluid: gas, petroleum, oil, medicine, etc.

The invention is not necessarily implemented in a meter, but applies to any flow rate control system, arranged to control the flow rate of a fluid flowing in a conduit, and comprising a solenoid valve, a current sensor arranged to measure the electric current supplied to the electric motor, and a processing circuit in which the monitoring method is implemented.

The monitoring value could be different from that described in this case. By way of example, the monitoring value could be the inrush current itself.

Naturally, the monitoring method described in FIG. 6 is not limiting. For example, it would be possible to implement the three corrective actions (and even other corrective actions) as soon as the monitoring value becomes greater than a predetermined threshold.

The invention claimed is:

1. A method for monitoring a solenoid valve comprising:
a movable member which extends in the conduit and for which a current position can be regulated in order to control a current flow rate of fluid that can flow in the conduit;
an electric motor arranged to cause the movable member to move so as to give it its current position;
the monitoring method comprising regularly repeated monitoring stages and each comprising the steps of:
driving the electric motor to modify the current position of the movable member;
evaluating a monitoring value representative of an inrush current of the electric motor during the driving step;
comparing the monitoring value with at least one first predetermined threshold and, if the monitoring value is greater than said first predetermined threshold, implementing at least one corrective action to avoid a blockage of the solenoid valve, the at least one corrective action comprising a corrective action consisting in increasing a supply voltage of the electric motor of the solenoid valve.

2. The monitoring method according to claim 1, wherein the at least one corrective action further comprises a corrective action consisting in increasing a frequency of implementation of the monitoring stages.

3. The monitoring method according to claim 1, wherein each monitoring stage comprises the step, if the monitoring value is greater than said first predetermined threshold, of comparing with a predetermined frequency threshold the frequency of implementation of the monitoring stages, and the step of:
if said frequency of implementation is lower than the predetermined frequency threshold, implementing the corrective action consisting in increasing the frequency of implementation of the monitoring stages, or
if said frequency of implementation is higher than the predetermined frequency threshold, implementing the corrective action consisting in increasing the power supply voltage of the electric motor of the solenoid valve.

4. The monitoring method according to claim 1, wherein each monitoring stage further comprises the steps, if the monitoring value is less than said first predetermined threshold, of comparing the monitoring value with a second predetermined threshold less than the first predetermined threshold and, if the monitoring value is less than said second predetermined threshold, of reducing a frequency of implementation of the monitoring stages.

5. The monitoring method according to claim 1, further comprising the step of acquiring measurements of a current flow rate of the fluid in the conduit, the monitoring steps being implemented only when the current flow rate is zero.

6. The monitoring method according to claim 1, wherein the monitoring value is equal to a ratio between the inrush current and a rated current of the electric motor during the driving step.

7. A flow rate control system comprising a solenoid valve, a current sensor arranged to measure an electric current supplied to the electric motor, and a processing circuit in which the monitoring method of claim 1 is implemented.

8. The flow rate control system according to claim 7, further comprising a power supply component arranged to power the processing circuit and the electric motor of the solenoid valve, the current sensor being a shunt mounted in parallel with two outputs of the power supply component.

9. The flow rate control system according to claim 7, wherein the solenoid valve is a ball valve.

10. A fluid meter comprising a flow rate measurement device and a flow rate control system according to claim 7.

11. The fluid meter according to claim 10, the flow rate measurement device being an ultrasonic measurement device comprising two transducers arranged to emit and receive ultrasonic signals in the conduit, the ultrasonic measurement device being arranged to evaluate a current flow rate of the fluid from the time of flight of the ultrasonic signals between the transducers.

12. The fluid meter according to claim 10, the solenoid valve being positioned along a length of the conduit between the two transducers.

13. Storage media which can be read by a computer, on which a computer program comprising instructions which cause the processing circuit of a meter to execute the steps of the measurement method as claimed in claim 1 is stored.

* * * * *